(12) United States Patent
Mizuno et al.

(10) Patent No.: US 9,208,975 B2
(45) Date of Patent: Dec. 8, 2015

(54) TURN SIGNAL INDICATOR DEVICE

(71) Applicant: Yazaki Corporation, Minato-ku, Tokyo (JP)

(72) Inventors: Yoshiyuki Mizuno, Makinohara (JP); Hidehiro Akahori, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 14/554,422

(22) Filed: Nov. 26, 2014

(65) Prior Publication Data

US 2015/0075954 A1  Mar. 19, 2015

Related U.S. Application Data

(63) Continuation of application No. PCT/JP2013/071284, filed on Aug. 6, 2013.

(30) Foreign Application Priority Data

Aug. 7, 2012 (JP) ................................. 2012-175223

(51) Int. Cl.
| | | |
|---|---|---|
| *H01H 3/16* | (2006.01) | |
| *B60Q 1/34* | (2006.01) | |
| *H01H 21/24* | (2006.01) | |
| *B60Q 1/40* | (2006.01) | |

(Continued)

(52) U.S. Cl.
CPC ............. *H01H 21/24* (2013.01); *B60Q 1/343* (2013.01); *B60Q 1/40* (2013.01); *B60Q 1/42* (2013.01); *B60Q 1/1461* (2013.01); *B60Q 1/1469* (2013.01); *B60Q 1/1484* (2013.01); *B60Q 1/34* (2013.01); *B60Q 1/346* (2013.01)

(58) Field of Classification Search
CPC .......... B60Q 1/40; B60Q 1/343; B60Q 1/346; B60Q 1/34; B60Q 1/1461; B60Q 1/1469; B60Q 1/1484
USPC .................................. 200/61.27–61.38, 61.3
See application file for complete search history.

(56) References Cited

U.S. PATENT DOCUMENTS

| | | | | | |
|---|---|---|---|---|---|
| 5,438,314 | A | * | 8/1995 | Evans | ........................... 340/477 |
| 5,486,809 | A | * | 1/1996 | Wadlington, Jr. | ........ B60Q 1/40 |
| | | | | | 200/61.27 |

(Continued)

FOREIGN PATENT DOCUMENTS

| | | |
|---|---|---|
| JP | 61-54333 A | 3/1986 |
| JP | 61-54334 A | 3/1986 |

(Continued)

OTHER PUBLICATIONS

Search Report dated Nov. 5, 2013 issued by the International Searching Authority in counterpart International Patent Application No. PCT/JP2013/071284 (PCT/ISA/210).

(Continued)

*Primary Examiner* — Lisa Caputo
*Assistant Examiner* — Jonathan Dunlap
(74) *Attorney, Agent, or Firm* — Sughrue Mion, PLLC

(57) ABSTRACT

There is provided a turn signal indicator device that drives a turn signal indicators provided on a vehicle based on on/off states of a switch, and includes an operation state discrimination part that discriminates between first turn signal indication for lane change of the vehicle and second turn signal indication for course change of the vehicle based on on/off signals supplied from the switch.

6 Claims, 8 Drawing Sheets

(51) Int. Cl.
　　B60Q 1/42　　(2006.01)
　　B60Q 1/14　　(2006.01)

(56) References Cited

U.S. PATENT DOCUMENTS

| | | | |
|---|---|---|---|
| 5,614,884 A * | 3/1997 | Evans | 340/477 |
| 5,646,590 A * | 7/1997 | Dembicks | 340/475 |
| 5,872,511 A * | 2/1999 | Ohkuma | 340/471 |
| 6,025,565 A | 2/2000 | Miyase et al. | |
| 6,876,300 B2 * | 4/2005 | Ponziani | 340/476 |
| 7,102,500 B2 * | 9/2006 | Martin et al. | 340/477 |
| 7,173,524 B2 * | 2/2007 | Ponziani | 340/476 |
| 7,233,848 B2 * | 6/2007 | Braeuchle et al. | 701/36 |
| 7,408,455 B2 * | 8/2008 | Ponziani | 340/476 |
| 7,554,436 B2 * | 6/2009 | Keller | 340/474 |
| 8,090,498 B2 * | 1/2012 | Ueno | 701/36 |
| 2004/0100373 A1 * | 5/2004 | Ponziani | 340/476 |
| 2005/0155808 A1 * | 7/2005 | Braeuchle et al. | 180/402 |
| 2005/0248449 A1 * | 11/2005 | Ponziani | 340/475 |
| 2007/0120661 A1 * | 5/2007 | Ponziani | 340/476 |
| 2009/0321229 A1 * | 12/2009 | Haug | 200/61.27 |
| 2014/0191860 A1 * | 7/2014 | Akamine | 340/474 |

FOREIGN PATENT DOCUMENTS

| | | |
|---|---|---|
| JP | 11-70833 A | 3/1999 |
| JP | 11-250772 A | 9/1999 |
| JP | 2008-50005 A | 3/2008 |
| JP | 2012-96708 A | 5/2012 |

OTHER PUBLICATIONS

Written Opinion dated Nov. 5, 2013 issued by the International Searching Authority in counterpart International Patent Application No. PCT/JP2013/071284 (PCT/ISA/237).

Notification of Transmittal of Translation of the International Preliminary Report dated Feb. 19, 2015 issued by International Bureau in counterpart International application No. PCT/JP2013/071284.

Written Opinion dated Nov. 5, 2013 issued by International Searching Authority in counterpart International Application No. PCT/JP2013/071284.

International Preliminary Report on Patentability dated Feb. 10, 2015 issued by the International Bureau on behalf of the International Searching Authority in counterpart International Application No. PCT/JP2013/071284.

* cited by examiner

TURN SIGNAL INDICATOR DEVICE

CROSS REFERENCE TO RELATED APPLICATIONS

This application is a continuation of PCT application No. PCT/JP2013/071284, which was filed on Aug. 6, 2013 based on Japanese Patent Application (No. 2012-175223) filed on Aug. 7, 2012, the contents of which are incorporated herein by reference.

BACKGROUND OF THE INVENTION

1. Technical Field

The present invention relates to a turn signal indicator device for a vehicle.

2. Background Art

For example, in the case where a vehicle changes its course by turning right or left at a road intersection (hereinafter, which vehicle's operation to change its course by turning right or left will be designated as course change), a driver should indicate a turn signal (display) so that drivers of the other vehicles can recognize the turn signal. Also in the case where, for example, a vehicle changes its traveling lane in a road having a plurality of lanes running in parallel (hereinafter, which vehicle's operation to change a traveling lane will be designated as lane change), a driver should indicate a turn signal.

Besides, the turn signal for the lane change may be performed merely for about several seconds in changing the lane. On the other hand, the turn signal for the course change needs to be continuously performed before starting the course change until completion of the course change.

In order to indicate a turn signal in such cases, a vehicle is provided, as a turn signal indicator, turn signal lamps in right and left portions on its body. Besides, in order to cause the right or left turn signal lamp to flash in the course change or the lane change, a turn signal indicating operation lever operable by a driver is provided in a portion of a steering column disposed in front of a driver's seat.

The turn signal indicating operation lever can be vertically swung as illustrated in FIG. 8 by a manual operation of a driver in general. This operation lever is usually in a neutral position P0, can be moved to an operation position PL1 or PL2 by raising the right end of the lever and can be moved to an operation position PR1 or PR2 by pushing down the right end of the lever.

Besides, when the operation lever is moved to the operation position PL1 or PR1, this lever operates as a momentary switch. When the driver releases a force applied to this operation lever, the operation lever automatically returns to the neutral position P0 from the operation position PL1 or PR1 by a force of a spring or the like.

On the other hand, when the operation lever is moved to the operation position PL2 or PR2, this lever operates as an alternative switch. When this operation lever is moved to the operation position PL2, this operation lever is retained in the operation position PL2 and does not return to the neutral position P0 even if the driver releases a force applied to the operation lever. Similarly, when the operation lever is moved to the operation position PR2, this operation lever is retained in the operation position PR2 and does not return to the neutral position P0 even if the driver releases a force applied to the operation lever. When the operation lever is moved to the operation position PL2 or PR2, the retention of the lever is automatically released if a steering angle of the steering wheel becomes small because of the completion of the course change, and thus, it returns to the neutral position P0.

Accordingly, the driver can continuously indicate the turn signal until the course change is completed by moving the operation lever to the operation position PL2 or PR2 without continuously pressing the operation lever for a long period of time. Alternatively, for the lane change, the driver can indicate the turn signal merely while he/she is operating the operation lever by moving the operation lever to the operation position PL1 or PR1.

Furthermore, a switch for such an operation lever is usually provided with five electric contacts SL1, SL2, S0, SR1 and SR2 as illustrated in FIG. 8. When the operation lever is in the operation position PL1, PL2, P0, PR1 or PR2, one of the electric contacts SL1, SL2, S0, SR1 and SR2 is selectively closed with the other contacts opened. It is noted that the contact corresponding to the neutral position is not provided in some cases.

As related-art techniques related to the operation lever and the turn signal indication described above, those disclosed in JP-A-S61-54333, JP-A-S61-54334, and JP-A-H11-250772 are known.

JP-A-S61-54333 discloses a momentary turn signal switch operable in operation positions of two stages (corresponding to the positions PL1, PL2, P0, PR1 and PR2 of FIG. 8). Besides, an electric circuit for driving a turn signal lamp holds (latches) the turn signal lamp in a driven state in accordance with a signal supplied when the switch is operated to the operation position of the second stage (corresponding to the position PL2 or PR2). Accordingly, although an operation lever of the switch is not mechanically retained also in the position of the second stage, the operation of the turn signal lamp is electrically controlled to be retained in a flashing state.

JP-A-S61-54334 further discloses that even if a switch corresponding to a position of the second stage (corresponding to the contact SL2 or SR2 of FIG. 8) is broken and always in an off state, an operation allocated to the switch corresponding to the position of the second stage can be performed by performing a specific operation, specifically, by turning on a switch corresponding to a position of the first stage (corresponding to the contact SL1 or SR1 of FIG. 8) by a plurality of times in a prescribed period of time.

JP-A-H11-250772 discloses the structure of a specific mechanical part including a turn signal indicating operation lever.

SUMMARY

As disclosed in JP-A-S61-54333, JP-A-S61-54334, and JP-A-H11-250772, a related-art turn signal indicating operation lever has the operation positions of two stages (corresponding to the positions PL1, PL2, PR1 and PR2 of FIG. 8) as the operation positions for indicating each of the left turn signal and the right turn signal. Besides, it has independent electric contacts (SL1, SL2, SR1 and SR2) respectively corresponding to the positions of the two stages. Furthermore, in the operation position (PL2 or PR2) of the second stage, it is necessary to mechanically self-retain the operation lever to be fixed in that position even if an operating force is released. Incidentally, if the technique of Patent Document 1 is employed, there is no need to mechanically self-retain the operation lever.

Since the turn signal indicating operation lever has the aforementioned structure, the mechanism is liable to be complicated, and it is difficult to make it compact.

Furthermore, the operation position (PL1 or PR1) of the lever where the turn signal indication for the lane change is executed and the operation position (PL2 or PR2) of the lever where the turn signal indication for the course change is executed are precedently determined due to the mechanical structure of the operation lever and cannot be changed. Therefore, some drivers may feel it difficult to operate because of sensuous differences among individuals. If, for example, a distance between the operation position of the first stage (PL1 or PR1) and the operation position of the second stage (PL2 or PR2) is too large or too small, there is a possibility that the turn signal indicating operation for the lane change may be performed by mistake as that for the course change, or vice versa.

The present invention was accomplished in consideration of the aforementioned circumstances, and an object of the present invention is to provide a turn signal indicator device capable of employing, as a turn signal indicating operation lever, an operation lever with a simple structure and capable of improving the operability for a driver.

In order to achieve the above-described object, a turn signal indicator device of the present invention has the following features (1) to (6):

(1) A turn signal indicator device that drives a turn signal indicator provided on a vehicle, the turn signal indicator device including:
an operation lever swingable from a neutral position disposed between a first operation position and a second operation position to the first operation position or the second operation position; and
a switch to be turned on/off when the operation lever is swung to the first operation position or the second operation position;
an operation state discrimination part that discriminates, based on an on/off signal supplied from the switch, between first turn signal indication performed for lane change of a vehicle and second turn signal indication performed for course change of the vehicle; and
a drive part that switches timing for energizing the turn signal indicator in accordance with the turn signal indication discriminated by the operation state discrimination part.

(2) The turn signal indicator device having the structure described in (1) above, in which the operation state discrimination part discriminates between the first turn signal indication and the second turn signal indication based on magnitude comparison, with a threshold value, of a length of a time period when the operation lever is retained in the first operation position or the second operation position.

(3) The turn signal indicator device having the structure as described in (1) above, further including a pressure sensor that detects a pressing force applied to the operation lever when the operation lever is operated to the first operation position or the second operation position, in which the operation state discrimination part discriminates between the first turn signal indication and the second turn signal indication based on magnitude comparison, with a threshold value, of a pressure detected by the pressure sensor.

(4) The turn signal indicator device having the structure as described in (2) above, in which the operation state discrimination part includes a threshold value setting unit that sets a value of the threshold value in accordance with an operation accepted by the operation lever.

(5) The turn signal indicator device having the structure as described in (3) above, in which the operation state discrimination part includes a threshold value setting unit that sets a value of the threshold value in accordance with an operation accepted by the operation lever.

(6) The turn signal indicator device having the structure as described in (2) above, in which the operation state discrimination part includes a function changing unit that switches correlation between the magnitude comparison and the first turn signal indication or the second turn signal indication in accordance with an operation accepted by the operation lever.

(7) The turn signal indicator device having the structure as described in (3) above, in which the operation state discrimination part includes a function changing unit that switches correlation between the magnitude comparison and the first turn signal indication or the second turn signal indication in accordance with an operation accepted by the operation lever.

(8) The turn signal indicator device having the structure as described in (1) above, further including a notification sound output part capable of selectively outputting notification sounds different in tone, in which the operation state discrimination part selects one of the notification sounds in accordance with the first turn signal indication or the second turn signal indication discriminated by itself, and the notification sound output part outputs the notification sound selected by the operation state discrimination part.

According to the turn signal indicator device having the structure described in (1) above, a signal for the first turn signal indication for the lane change and a signal for the second turn signal indication for the course change can be respectively output by using the operation lever having the operation positions of merely one stage. Accordingly, the structure of the operation lever can be simplified, and the number of electric contacts can be reduced. Besides, an area (region) where the electric contacts are provided can be made small. Furthermore, since the operation positions of the operation lever are limited to merely one stage, an operation mistake can be reduced.

According to the turn signal indicator device having the structure described in (2) above, the signal for the first turn signal indication for the lane change and the signal for the second turn signal indication for the course change can be respectively output depending on the length of a time period when a driver retains the operation lever in a prescribed position.

According to the turn signal indicator device having the structure described in (3) above, the signal for the first turn signal indication for the lane change and the signal for the second turn signal indication for the course change can be respectively output depending on the magnitude comparison of a force applied to the operation lever when a driver moves the operation lever to a prescribed position.

According to the turn signal indicator device having the structure described in (4) and (5) above, the threshold value for distinguishing the first turn signal indication for the lane change and the second turn signal indication for the course change from each other can be changed by a user (a driver) as he/she likes. Accordingly, the turn signal indicator device can be adjusted to attain a state where every user feels it easy to operate.

According to the turn signal indicator device having the structure described in (6) and (7) above, an operation for the first turn signal indication for the lane change and an operation for the second turn signal indication for the course change can be exchanged. Accordingly, the turn signal indicator device can be adjusted to attain a state where every user feels it easy to operate.

According to the turn signal indicator device having the structure described in (8) above, a driver can easily recognize a current state in accordance with the type of output notification sound with the first turn signal indication and the second turn signal indication distinguished from each other. Accordingly, an operation mistake can be prevented.

According to the present invention, the structure of an operation lever can be simplified and the number of electric contacts can be reduced. Besides, an area (region) where the electric contacts are provided can be made small.

The present invention has been briefly described. Furthermore, the present invention will be more clearly defined in detail by reading through modes for carrying out the present invention (hereinafter referred to as embodiments) described below with reference to the accompanying drawings.

DETAILED DESCRIPTION OF THE EXEMPLARY EMBODIMENTS

Specific embodiments of a turn signal indicator device of the present invention will now be described with reference to the accompanying drawings.

<First Embodiment>
<Structure of Device>

Figure 1:
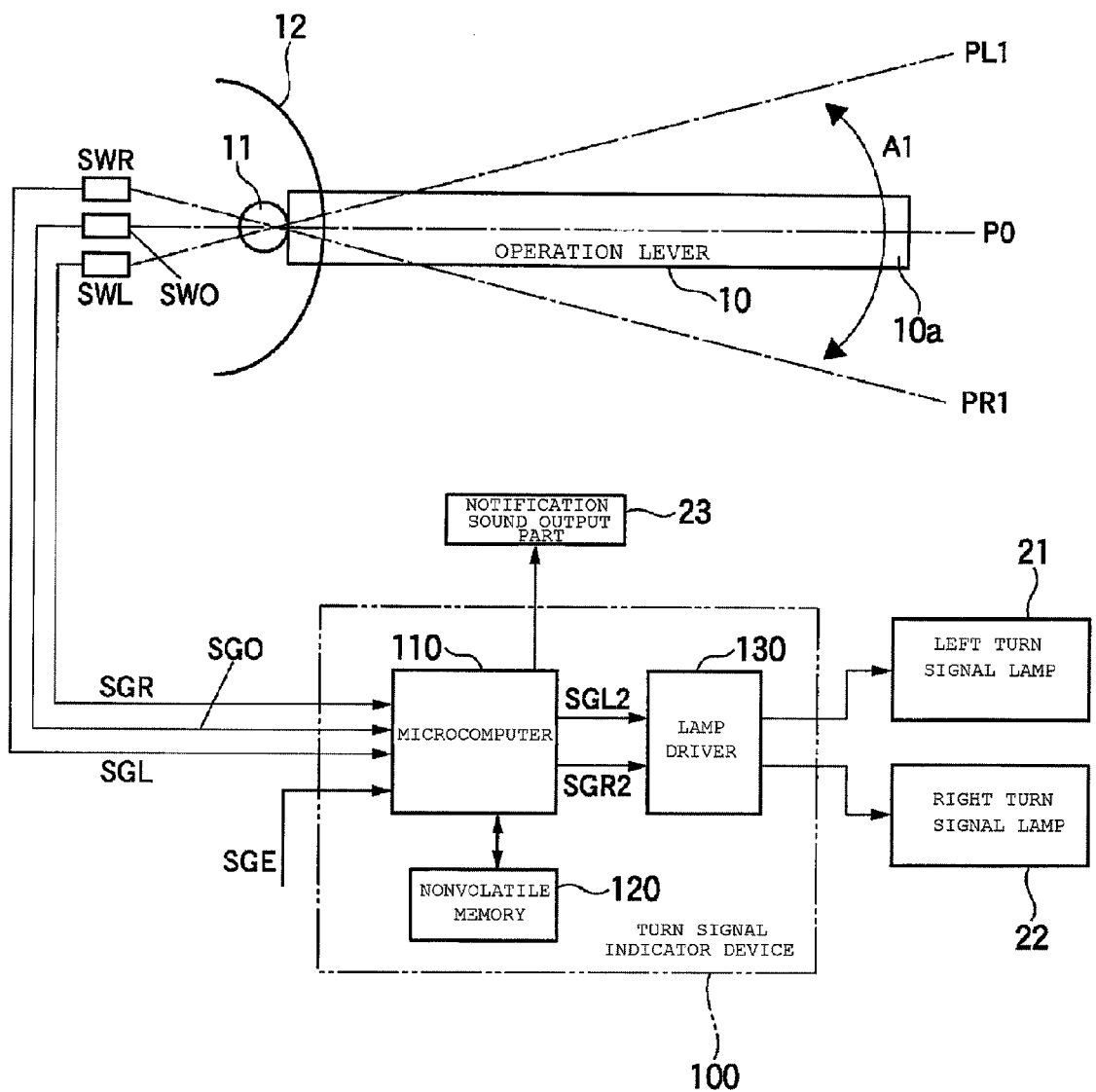
FIG. 1 is a block diagram illustrating an example of the structure of a turn signal indicator device according to an embodiment.

An example of the structure of a turn signal indicator device 100 according to the present invention is illustrated in FIG. 1.

<Explanation of Operation Lever>

An operation lever 10 of FIG. 1 is operated by a driver for operating a turn signal indicator of a vehicle. This operation lever 10 is set on a steering column 12 so as to be swingable around a rotating shaft 11 in a direction of an arrow A1. Besides, when no external force is applied, the operation lever 10 is positioned in a neutral position P0 as illustrated in FIG. 1, and at this time, it protrudes rightward from the steering column 12 to be retained in a substantially horizontal state. When the driver moves a lever end 10a upward or downward, it can be moved to an operation position PL1 or PR1.

Besides, even when the operation lever 10 is moved to the operation position PL1 or PR1, if the driver releases a force applied for operating the operation lever 10, the operation lever 10 automatically returns to the neutral position P0 owing to the restoring force of a spring not shown. A swinging range of the operation lever 10 is limited to a range between the operation positions PL1 and PR1 owing to a regulating member not shown. Furthermore, even when it is moved to the operation potion PL1 or PR1, the position of the operation lever 10 is never retained unless the driver continuously applies the operating force. In other words, the operation lever 10 operates as a momentary switch.

<Explanation of Switch Contacts>

As illustrated in FIG. 1, the operation lever 10 is connected to three switch contacts SWL, SWR and SW0. When the operation lever 10 is in the neutral position P0, the switch contact SW0 is placed in an on (closed) state and the other switch contacts SWL and SWR are placed in an off (opened) state. Alternatively, when the operation lever 10 is moved to a position other than the neutral position P0, the switch contact SW0 is turned off. Besides, when the operation lever 10 is moved to the operation position PL1, the switch contact SWL is turned on, and when it is moved to a position other than the operation position PL1, the switch contact SWL is turned off. Furthermore, when the operation lever 10 is moved to the operation position PR1, the switch contact SWR is turned on, and when it is moved to a position other than the operation position PR1, the switch contact SWL is turned off. It is noted that the switch contact SW0 may be omitted.

<Explanation of Turn Signal Indicating Operation>

For performing course change to turn left or for changing a currently driving lane to another lane on the left hand side (lane change), a driver can indicate the turn signal (display with flashing) by moving the operation lever 10 to the operation position PL1. Alternatively, for performing course change to turn right or for changing a currently driving lane to another lane on the right hand side (lane change), the driver can indicate the turn signal (display) by moving the operation lever 10 to the operation position PL1. The turn signal indicator device 100 of the present invention discriminates the two types of turn signal indication (for the course change and the lane change) by using the same operation position (PL1 or PR1) in accordance with a difference in the operation situation of the operation lever 10 as described below.

<Explanation of Turn Signal Indicator>

A vehicle is equipped with a left turn signal lamp 21 on the left side of a body as a turn signal indicator, and is also equipped with a right turn signal lamp 22 on the right side of the body as a turn signal indicator. The turn signal for the course change to turn left or the lane change to a left lane can be indicated by flashing the left turn signal lamp 21. Alternatively, the turn signal for the course change to turn right or the lane change to a right lane can be indicated by flashing the right turn signal lamp 22.

<Explanation of Turn Signal Indicator Device 100>

For driving the left turn signal lamp 21 and the right turn signal lamp 22, the turn signal indicator device 100 is provided. As illustrated in FIG. 1, the turn signal indicator device 100 includes a microcomputer 110, a nonvolatile memory 120 and a lamp driver 130.

The microcomputer 110 performs an operation described below by executing a control program precedently built therein. Specifically, in accordance with the operation of the operation lever 10 performed by a driver, it outputs a left turn signal control signal SGL2 and a right turn signal control signal SGR2 for the turn signal indication.

Electric signals SGL, SG0 and SGR respectively output from the above-described switch contacts SWL, SW0 and SWR connected to the operation lever 10 are input to input ports of the microcomputer 110 via prescribed electric wires.

Besides, a steering end signal SGE is also input to an input port of the microcomputer 110. The steering end signal SGE is turned on when a steering angle corresponding to the operation amount of the steering wheel returns from a large angle to a small angle (neutral, namely, a straight traveling state) in the course change of the vehicle. This steering end signal SGE can be generated by installing a prescribed switch or steering angle sensor in a steering mechanism of the vehicle.

The nonvolatile memory 120 precedently holds constant data of a threshold value and the like used in the control performed by the microcomputer 110. Besides, the contents of the data held by the nonvolatile memory 120 can be rewritten under control of the microcomputer 110 if necessary, and the data never disappears even if power supply from a power source is stopped.

The lamp driver 130 includes switching transistors and relays therein, and turns on/off the left turn signal lamp 21 in accordance with the left turn signal control signal SGL2 input to the lamp driver 130. Besides, it turns on/off the right turn signal lamp 22 in accordance with the right turn signal control signal SGR2 input to the lamp driver 130.

Furthermore, an output of the microcomputer 110 is connected to a notification sound output part 23. The notification sound output part 23 can output a plurality of types of sounds for notifying a driver of an operation state of the turn signal indicator device 100. The type of notification sound to be output from the turn signal indicator device 100, the turning on/off of the notification sound output, the timing of outputting the notification sound and the like are controlled by the microcomputer 110.

<Operation of Device>

Figure 2:
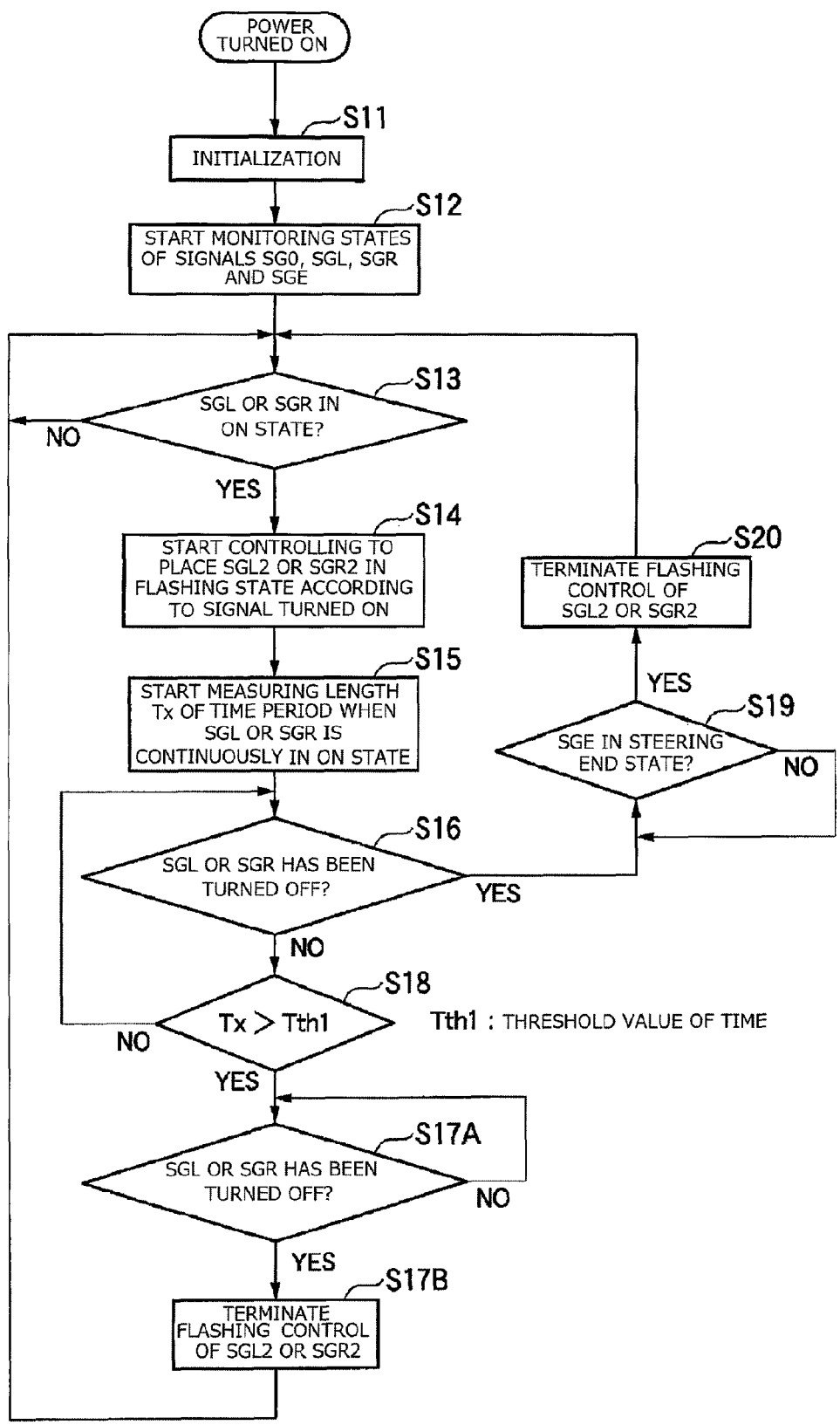
FIG. 2 is a flowchart illustrating a basic operation of the turn signal indicator device of the embodiment.

The basic operation of the turn signal indicator device 100 of the present invention is illustrated in FIG. 2. The microcomputer 110 illustrated in FIG. 1 executes the operation illustrated in FIG. 2. The operation of FIG. 2 will now be described.

When the power source is turned on and power is supplied from a power circuit of the vehicle to the turn signal indicator device 100, the microcomputer 110 starts the operation from step S11 of FIG. 2. In the first step S11, initialization is performed. In step S11, the microcomputer 110 initializes itself, stops the output of the left turn signal control signal SGL2 and the right turn signal control signal SGR2, stops the output of a notification sound from the notification sound output part 23, and reads parameters of a threshold value and the like necessary for the control from the nonvolatile memory 120.

In next step S12, the microcomputer 110 starts to monitor the states of the respective input ports. From this point forward, the microcomputer 110 can periodically acquire information corresponding to the latest states of the electric signals SG0, SGL, SGR and SGE.

In step S13, the microcomputer 110 discriminates whether or not either of the electric signals SGL and SGR has been turned on. In a case where either of the electric signals SGL and SGR has been turned on, the process proceeds to next step S14, and in the other cases, the processing of step S13 is repeated. Specifically, if a driver operates the operation lever 10 to move it to the operation position PL1 or PR1, the process proceeds to next step S14.

In step S14, the microcomputer 110 controls the left turn signal control signal SGL2 or the right turn signal control signal SGR2 in accordance with the signal (SGL or SGR) having been turned on. If the electric signal SGL has been turned on, the microcomputer 110 periodically turns on/off the left turn signal control signal SGL2 so as to control the left turn signal lamp 21 to be placed in a flashing state. Alternatively, if the electric signal SGR has been turned on, the microcomputer 110 periodically turns on/off the right turn signal control signal SGR2 so as to control the right turn signal lamp 22 to be placed in a flashing state.

In step S15, the microcomputer 110 starts to measure, by using an internal timer, a length Tx of a time when the electric signal SGL or SGR is continuously in an on state.

In step S16, the microcomputer 110 discriminates whether or not the electric signal SGL or SGR has been turned off from the on state. If it has been turned off, the process proceeds to step S19, and if it has not been turned of the process proceeds to step S18. Specifically, if it is detected that the driver has released the operation lever 10 after operating the operation lever 10, the process proceeds to step S19.

In step S18, the microcomputer 110 compares the length Tx of the time measured by using the internal timer with a threshold value Tth1 (of, for example, 1 second). If "Tx>Tth1", the process proceeds to next step S17A, and if "Tx≤Tth1", the process returns to the processing of step S16. Incidentally, the information of the threshold value Tth1 is held in the nonvolatile memory 120.

In other words, if the signal SGL or SGR has been turned off before the time Tth1 elapses, the process proceeds to step S19. Alternatively, if the signal SGL or SGR is kept in an on state until the time Tth1 elapses, the process proceeds to step S17A.

In step S17A, the microcomputer 110 discriminates whether or not the signal SGL or SGR has been turned off, and if it has been turned off, the process proceeds to next step S17B. If the signal SGL or SGR has been turned off in step S17A, the microcomputer 110 regards that as detection of a termination operation of the turn signal indication, and the process proceeds to step S17B. In step S17B, it controls the left turn signal control signal SGL2 and the right turn signal control signal SGR2 to be turned off. Thus, the flashing of the left turn signal lamp 21 or the right turn signal lamp 22 is terminated to switch the lamp to an extinction state. Besides, the microcomputer 110 terminates the operation of the internal timer. Incidentally, in detecting the termination operation of the turn signal indication, the lamp may be switched to an extinction state in step S17B after a prescribed time has elapsed or after waiting for the lamp completely flashing by a prescribed number of times.

In step S19, the microcomputer 110 discriminates whether or not the steering end signal SGE has been placed in a steering end state. If the steering end signal SGE is in the steering end state, the process proceeds to next step S20.

In step S20, the microcomputer 110 regards that as detection of the termination operation of the turn signal indication, and controls the left turn signal control signal SGL2 and the right turn signal control signal SGR2 to be turned off. Thus, the flashing of the left turn signal lamp 21 or the right turn signal lamp 22 is terminated to switch the lamp to an extinction state. Besides, the microcomputer 110 terminates the operation of the internal timer.

<Explanation of Difference Between Course Change and Lane Change>

When the turn signal indicator device 100 executes the operation illustrated in FIG. 2, turn signal indicating operations for the course change and the lane change can be distinguishably performed as follows:

<For Course Change>

If a driver has moved the operation lever 10 to the operation position PL1 or PR1 for a short period of time (of, for example, less than 1 second) and then immediately released the operation lever 10, the operation lever 10 returns to the neutral position P0 immediately after. In this case, the process proceeds from step S16 to step S19 of FIG. 2.

In this case, the flashing for indicating the turn signal is performed until a steering end state is detected in accordance with the steering end signal SGE, and then the flashing is terminated. Therefore, a turn signal indicating action suitable to the course change to turn left or right at a road intersection can be performed.

<For Lane Change>

On the other hand, if a driver has moved the operation lever 10 to the operation position PL1 or PR1 and retained it to the operation position for a comparatively long time (of, for example, 1 second or more) by continuously applying a force, the process proceeds from steps S16 to steps S18-S17A-S17B of FIG. 2.

In this case, the flashing for indicating the turn signal is performed correspondingly to the time when the driver operates the operation lever 10, or for a precedently set time or by a precedently set number of flashing times, and then, the flashing is terminated.

In the case of the lane change, the change in the steering angle is small, and hence, there is a possibility that the steering end signal SGE may not be properly output. When the processing of step S16 to steps S18-S17A-S17B of FIG. 2 is performed, however, a turn signal indicating action suitable to the lane change can be carried out. Incidentally, in the case where the length of the time when the turn signal is continuously indicated by the operation lever 10 is comparative short (of approximately 1 second), the flashing for the turn signal indication is preferably continued for a time period corresponding to the time of operating the operation lever 10 so that the intention of the driver can be reflected.

<Summary of Difference Between Course Change and Lane Change>

The following is a summary of the turn signal indicating operations performed for the course change and the lane change: For the course change, it is necessary to indicate the turn signal for a comparatively long period of time until the course change action is completed. In the course change, however, a driver needs to perform a driving operation for adjusting the steering angle by rotating the steering wheel. Therefore, it is difficult for the driver to retain the operation lever 10 for a long period of time simultaneously with this driving operation. In the operation illustrated in FIG. 2, even if the driver releases the operation lever 10, the turn signal indicating action is automatically continued until a steering end state is detected in accordance with the steering end signal SGE (step S19). Therefore, the turn signal indicating action can be realized by the turn signal indicating operation suitable to the course change.

On the other hand, even when the operation lever 10 is in the same operation position, if the time Tx for retaining the operation lever exceeds the threshold value Tth1, it is recognized as the operation for the lane change, and the flashing for the turn signal indication can be terminated regardless of the change in the steering angle (steps S17A and S17B). Therefore, even in the case of the lane change in which there is a possibility that the steering end signal SGE may not be properly output because of small change in the steering angle, the turn signal indicating action can be realized by the turn signal indicating operation suitable to the lane change.

<Advantages of Turn Signal Indicator Device 100>

As illustrated in FIG. 1, in the case where the above-described turn signal indicator device 100 is employed, the operation positions of the operation lever 10 are provided as merely one stage with respect to each of the right and left sides, and since a momentary type operation is performed, there is no need to mechanically retain the position of the operation lever 10. Furthermore, since the operation positions are provided as merely one stage, the number of switch contacts and wires connected to the operation lever 10 is small. Accordingly, the structure of the operation lever 10 and its accompanying mechanism can be simplified and made compact.

Besides, since the operation positions (PL1 and PR1) of the operation lever 10 are provided as merely one stage, a driver never makes a mistake in the operation position. Furthermore, since the turn signal indicating operation for the course change and the turn signal indicating operation for the lane change are distinguished from each other depending on the time for operating the operation lever 10, a driver can intuitively and easily perform these turn signal indicating operations distinguishably.

<Second Embodiment>
<Structure of Device>

Figure 3:
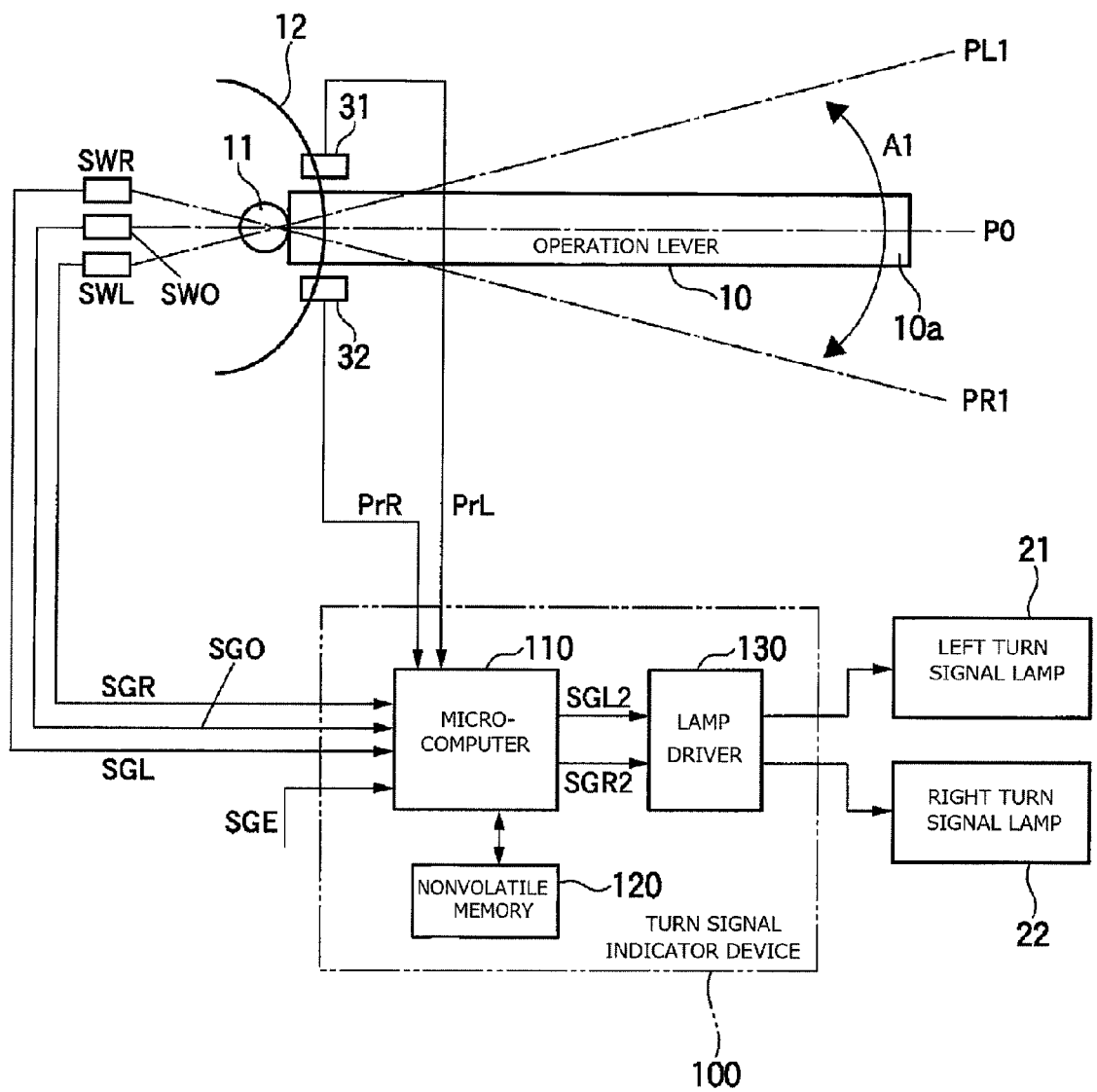
FIG. 3 is a block diagram illustrating a modification of the structure of the turn signal indicator device.

An example of a turn signal indicator device 100 of the present embodiment is illustrated in FIG. 3. In the structure illustrated in FIG. 3, pressure sensors 31 and 32 are additionally provided. Apart from them, the structure is the same as that illustrated in FIG. 1. Incidentally, like reference numerals are used in FIG. 3 to refer to elements corresponding to those illustrated in FIG. 1.

As illustrated in FIG. 3, the pressure sensors 31 and 32 for detecting a pressing force applied to the operation lever 10 are provided in prescribed portions of the steering column 12. The upper pressure sensor 31 detects a pressing force applied by a driver to the operation lever 10 when the operation lever 10 is moved to the operation position PL1. The lower pressure sensor 32 detects a pressing force applied by the driver to the operation lever 10 when the operation lever 10 is moved to the operation position PR1.

An electric signal PrL corresponding to a pressure detected by the pressure sensor 31 and an electric signal PrR corresponding to a pressure detected by the pressure sensor 32 are input respectively through prescribed electric wires to the microcomputer 110 of the turn signal indicator device 100. Accordingly, the microcomputer 110 can grasp the pressing force applied to the operation lever 10. The structure of FIG. 3 other than the aforementioned point is the same as that of FIG. 1, and hence the description is herein omitted.

<Operation of Device>

Figure 4:
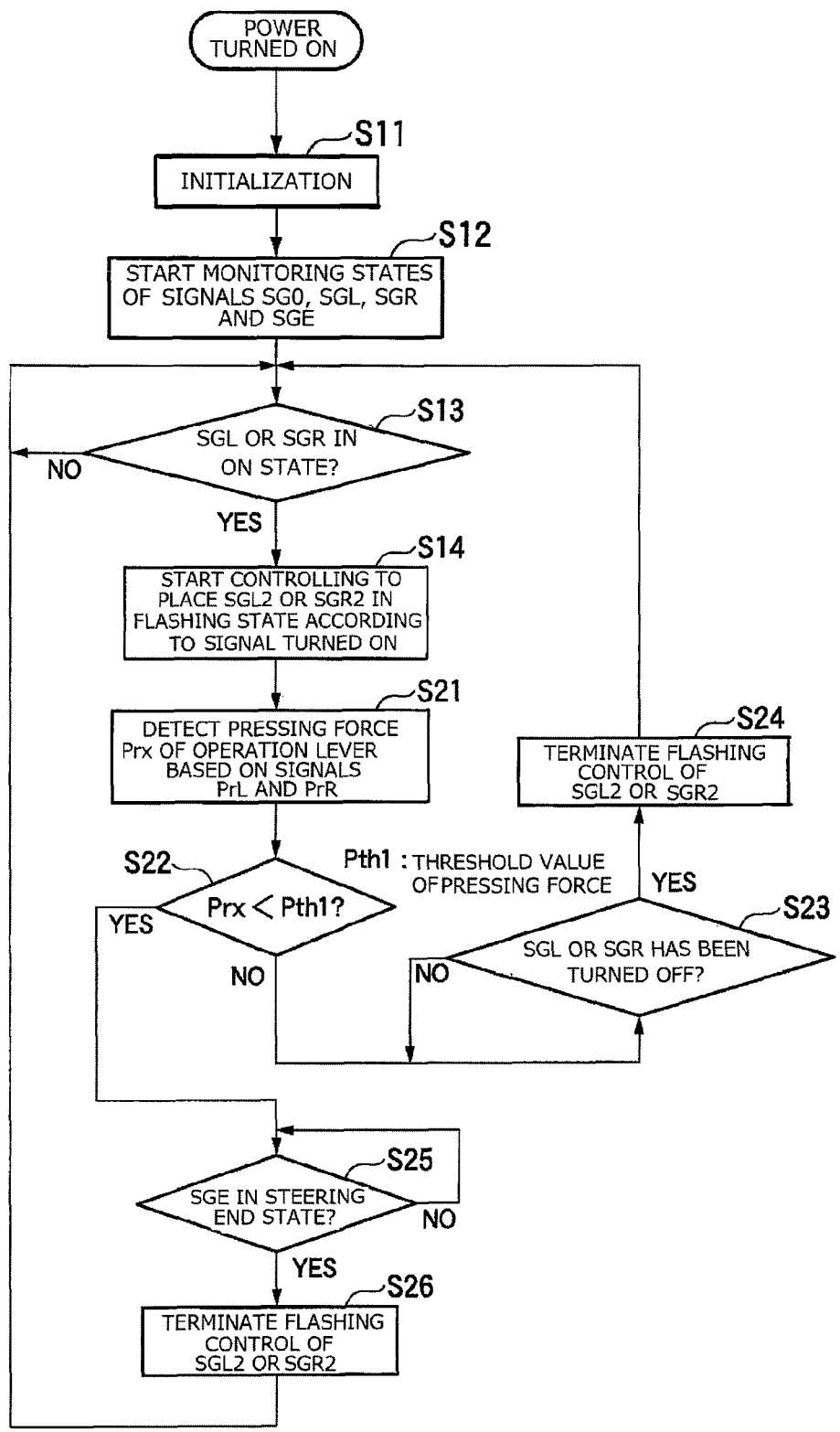
FIG. 4 is a flowchart of a modification (1) of the operation of the turn signal indicator device.

The operation of the turn signal indicator device 100 of the present embodiment is illustrated in FIG. 4. The microcomputer 110 illustrated in FIG. 3 executes the operation illustrated in FIG. 4. Incidentally, like step numbers are used in FIG. 4 for steps corresponding to those of FIG. 2.

The operation of FIG. 4 will now be described. In FIG. 4, steps S11 to S14 are the same as those of FIG. 2 described above.

In step S21, the microcomputer 110 detects a pressing force Prx applied to the operation lever 10 by referring to the electric signals PrL and PrR corresponding to the pressures. Specifically, one of the electric signals PrL and PrR having a larger value is detected as the pressing force Prx.

In step S22, the microcomputer 110 compares the value (magnitude) of the pressing force Prx detected in step S21 with a threshold value Pth1. If "Prx<Pth1", the process proceeds to step S25, and if "Prx≥Pth1", the process proceeds to step S23. Incidentally, the information of the threshold value Pth1 is held in the nonvolatile memory 120. The threshold value Pth1 is information used for determining whether the force applied by the driver to the operation lever 10 is large or small.

In step S23, the microcomputer 110 discriminates whether or not the electric signal SGL or SGR has been turned off from an on state. After the electric signal SGL or SGR has been turned off the process proceeds from step S23 to step S24. In other words, the process proceeds to step S24 when it is detected that the driver has released the operation lever 10 after operating the operation lever 10.

In step S24, the microcomputer 110 regards that a termination operation of the turn signal indication has been detected, and controls the left turn signal control signal SGL2 and the right turn signal control signal SGR2 to be turned off. Thus, the flashing of the left turn signal lamp 12 or the right turn signal lamp 22 is terminated to switch the lamp to an extinction state. Incidentally, in detecting the termination operation of the turn signal indication, the lamp may be switched to an extinction state in step S24 after a prescribed time has elapsed or after waiting for the lamp completely flashing by a prescribed number of times.

In step S25, the microcomputer 110 discriminates whether or not the steering end signal SGE has been placed in a steering end state. If the steering end signal SGE is in a steering end state, the process proceeds to next step S26.

In step S26, the microcomputer 110 regards that the termination operation of the turn signal indication has been detected, and controls the left turn signal control signal SGL2 and the right turn signal control signal SGR2 to be turned off. Thus, the flashing of the left turn signal lamp 21 or the right turn signal lamp 22 is terminated to switch the lamp to an extinction state.

<Explanation of Difference Between Course Change and Lane Change>

In the case where the turn signal indicator device 100 executes the operation illustrated in FIG. 4, the turn signal indicating operations for the course change and the lane change can be distinguishably performed as follows:

<For Lane Change>

If a driver moves the operation lever 10 to the operation position PL1 or PR1 by applying a comparatively large force to the operation lever 10, the process proceeds from step S22 to steps S23-S24 of FIG. 4. In step S24, the flashing for indicating the turn signal is performed for a time period corresponding to the time when the operation lever 10 is operated, or for a prescribed time period or by a prescribed number of flashing times, and then, the flashing is terminated.

Accordingly, even in the case of the lane change in which there is a possibility that the steering end signal SGE may not be properly output because of small change in the steering angle, a turn signal indicating action can be performed by the turn signal indicating operation suitable to the lane change. Incidentally, in the case where the length of the time for continuously indicating the turn signal is comparatively short, the flashing for the turn signal indication is preferably continued for a time period corresponding to the time of operating the operation lever 10 so that the intention of the driver can be reflected.

<For Course Change>

On the other hand, if a driver moves the operation lever 10 to the operation position PL1 or PR1 by applying a comparatively small force to the operation lever 10, the process proceeds from step S22 to steps S25-S26 of FIG. 4.

In this case, the flashing for the turn signal indication is performed until a steering end state is detected in accordance with the steering end signal SGE, and then the flashing is terminated. Therefore, a turn signal indicating action suitable to the course change to turn left or right at a road intersection can be performed.

For the course change, it is necessary to continuously indicate the turn signal over a comparatively long period of time until the course change action is completed. In the course change, however, a driver needs to perform a driving operation for adjusting the steering angle by rotating the steering wheel. Therefore, it is difficult for the driver to retain the operation lever 10 for a long period of time simultaneously with this driving operation. In the operation illustrated in FIG. 4, in the case where a driver operates the operation lever 10 with a force smaller than the threshold value Pth1, even if the driver immediately releases the operation lever 10, the turn signal indicating action is automatically continued until a steering end state is detected in accordance with the steering end signal SGE. Therefore, the turn signal indicating action can be realized by the turn signal indicating operation suitable to the course change.

<Advantages of Turn Signal Indicator Device 100>

In the case where the turn signal indicator device 100 performing the operation illustrated in FIG. 4 is employed, the operation positions of the operation lever 10 are provided as merely one stage with respect to each of the right and left sides as illustrated in FIG. 3, and since a momentary type operation is performed, there is no need to mechanically retain the position of the operation lever 10. Furthermore, since the operation positions are provided as merely one stage, the number of switch contacts and wires connected to the operation lever 10 is small. Accordingly, the structure of the operation lever 10 and its accompanying mechanism can be simplified and made compact.

Besides, since the operation positions (PL1 and PR1) of the operation lever 10 are provided as merely one stage, a driver never makes a mistake in the operation position. Furthermore, since the turn signal indicating operation for the course change and the turn signal indicating operation for the lane change are distinguished from each other depending on a pressing force applied to the operation lever 10, a driver can intuitively and easily perform these turn signal indicating operations distinguishably.

<Third Embodiment>

<Structure and Operation of Device>

Figure 5:
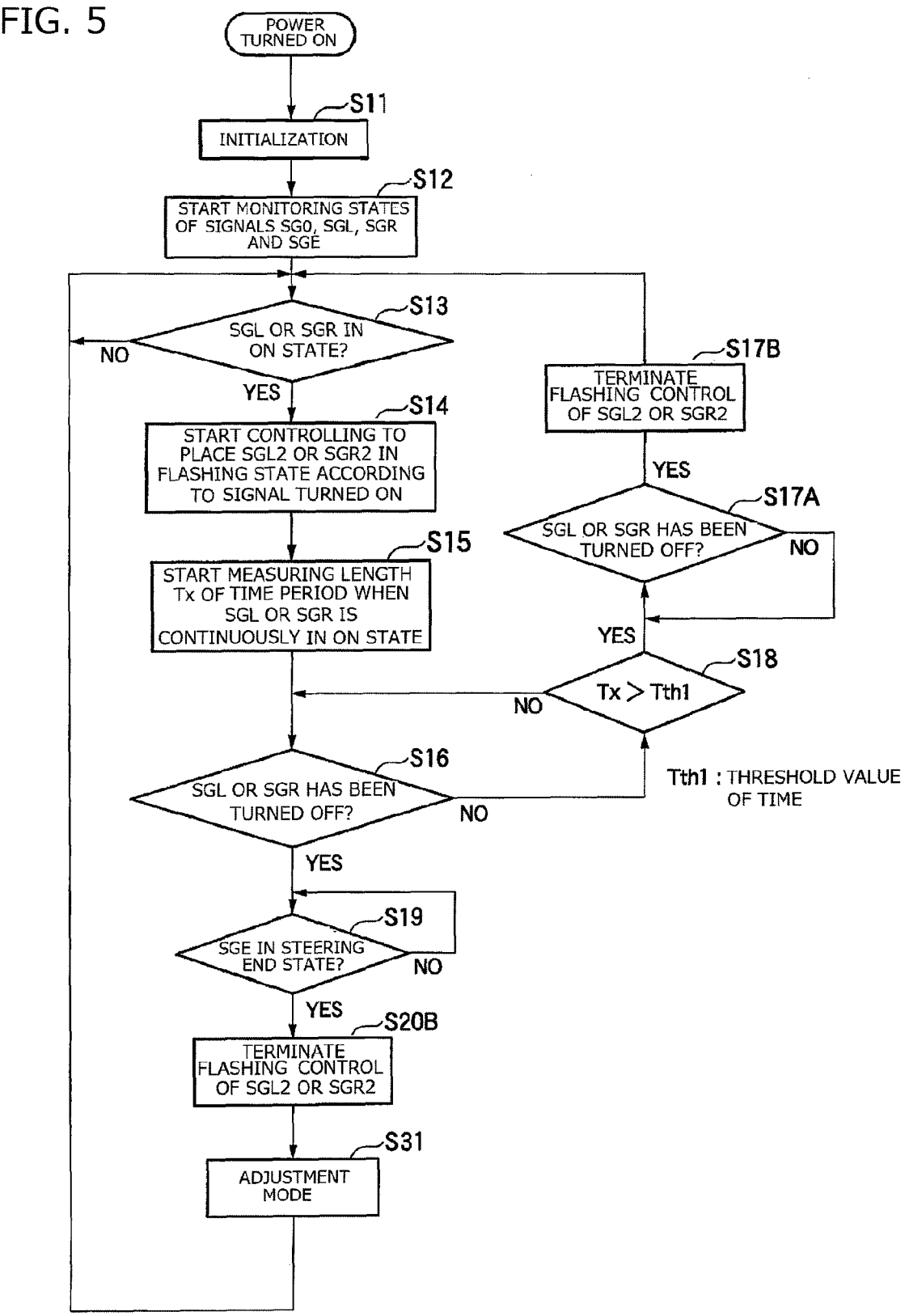
FIG. 5 is a flowchart of a modification (2) of the operation of the turn signal indicator device.

The structure of a turn signal indicator device 100 of the present embodiment is the same as that illustrated in FIG. 1. Besides, the operation of the turn signal indicator device 100 of the present embodiment is illustrated in FIG. 5. Incidentally, the operation of FIG. 5 is a modification of the operation of FIG. 2, and like step numbers are used to refer to like processing.

The operation of FIG. 5 will now be described. The operation performed in steps S11 to S19 of FIG. 5 is the same as that illustrated in FIG. 2.

In step S20B of FIG. 5, the microcomputer 110 regards that a termination operation of the turn signal indication has been detected, and controls the left turn signal control signal SGL2 and the right turn signal control signal SGR2 to be turned off. Thus, the flashing of the left turn signal lamp 21 or the right turn signal lamp 22 is terminated to switch the lamp to an extinction state. Incidentally, in this case, the operation of the internal timer is continued.

Subsequently, the microcomputer 110 discriminates whether or not a prescribed condition for entering an "adjustment mode" has been satisfied, and if the condition has been satisfied, the process proceeds to next step S31. Transition to the "adjustment mode" in step S31 is processing additionally performed in the present embodiment. The "adjustment mode" is a mode in which the value of a threshold value Tth1 held in the nonvolatile memory 120 is changed by a user operation. Specific examples of the condition for entering the "adjustment mode" include the following:

(A) A case where the steering angle is close to 0 (zero), and the signal SGL or SGR has been kept in an on state for a prescribed period of time (of, for example, 10 seconds) or longer and then turned off.

(B) A case where the steering angle is close to 0 (zero), and the signal SGL or SGR has been repeatedly turned on by a plurality of times in a prescribed period of time (of, for example, 5 seconds).

The microcomputer 110 makes comparison with, for example, the condition (A) or (B) above based on a time period measured with the internal timer, so as to discriminate whether or not the prescribed condition for entering the "adjustment mode" has been satisfied. Incidentally, parameters of time period and number of times for such a condition may be held in the nonvolatile memory 120.

If the prescribed condition has been satisfied, the microcomputer 110 temporarily shifts to the operation mode for adjusting the time threshold value Tth1. A specific example of adjustment made in this operation mode is as follows.

After returning the operation lever 10 to the neutral position P0, a user operates the operation lever 10 again to move it to the operation position PL1 or PR1 and retains it in this position for a desired period of time. This time period is measured by the microcomputer 110, and the value of the threshold value Tth1 held in the nonvolatile memory 120 is updated to the measured time period.

Incidentally, the number of seconds corresponding to the threshold value Tth1 may be determined as, for example, "1 second", "2 seconds" or "3 seconds" in accordance with the number of times of the user operating the operation lever 10.

If the user retains the operation lever 10 again in the operation position PL1 or PR1 for a long period of time (equal to or longer than a time Tmax), the adjustment mode is shifted to the normal operation mode, and the process returns to step S13. Thus, the adjustment mode is terminated.

<Advantages of Turn Signal Indicator Device 100>

In the case where the turn signal indicator device 100 performing the operation of FIG. 5 is employed, the time length (Tth1) employed for distinguishing the turn signal indicating operation for the course change and the turn signal indicating operation for the lane change can be adjusted by a driver himself/herself as he/she likes or for improving the operability.

Figure 8:
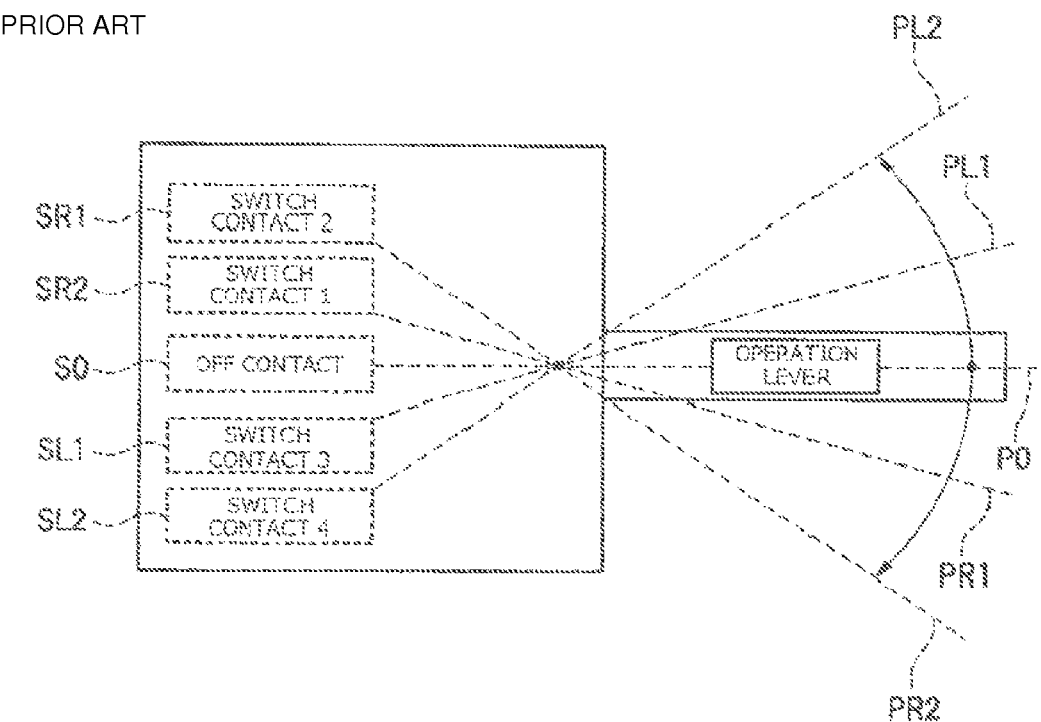
FIG. 8 is a front view illustrating the structure of a general turn signal indicating operation lever.

Incidentally, in the case where the operation lever has, as illustrated in FIG. 8, the operation positions (PL1, PL2, PR1 and PR2) of the two stages, the turn signal indicating operation for the course change and the turn signal indicating operation for the lane change are determined depending on the physical positions, and hence, the operation positions cannot be changed. In the turn signal indicator device 100 of the present embodiment, however, the operation positions of the operation lever 10 are provided merely as one stage as illustrated in FIG. 1, and the two types of operations are distinguished by using the threshold value (Tth1). Therefore, the operability can be improved by adjusting this threshold value.

Incidentally, also in the turn signal indicator devices 100 of FIGS. 3 and 4, the threshold value (Pth1) may be adjusted through a user input operation by additionally performing processing equivalent to that of FIG. 5 (step S31).

<Fourth Embodiment>
<Structure and Operation of Device>

Figure 6:
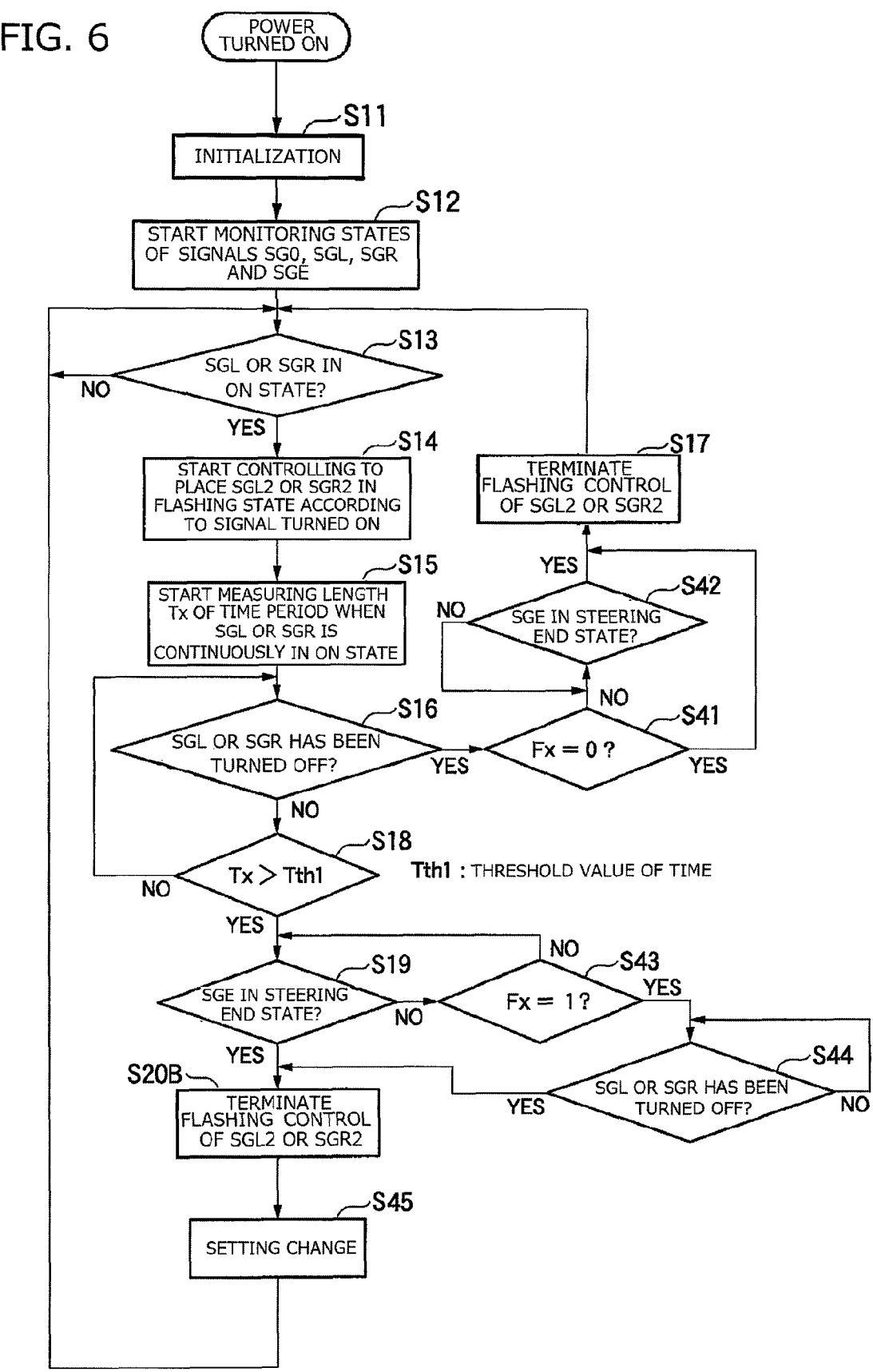
FIG. 6 is a flowchart of a modification (3) of the operation of the turn signal indicator device.

The structure of a turn signal indicator device 100 of the present embodiment is the same as that illustrated in FIG. 1. Besides, the operation of the turn signal indicator device 100 of the present embodiment is illustrated in FIG. 6. Incidentally, the operation of FIG. 6 is a modification of the operations of FIG. 2 and FIG. 5, and like step numbers are used to refer to like processing.

The operation of FIG. 6 will now be described. The operation performed in steps S11 to S19 of FIG. 6 is the same as that illustrated in FIG. 2. In FIG. 6, processing of steps S41 to S44 is additionally performed.

In step S16 of FIG. 6, if it is detected that the electric signal SGL or SGR has been turned off from an on state, the process of the microcomputer 110 proceeds to step S41. In step S41, the microcomputer 110 discriminates the state of a flag Fx. This flag Fx corresponds to information of correlation of combinations between turn signal indicating operations and two kinds of functions, and is held in the nonvolatile memory 120. The information of the flag Fx is "0" or "1". Specifically, the flag Fx holds the correlation of the combination between each of the "course change" operation and the "lane change" operation and the length of a time period for operating the lever. Accordingly, when the state of the flag is switched, the correlation between the length of the operating time and each of the "course change" operation and the "lane change" operation is switched.

If "Fx=0" in step S41, the process proceeds to step S17, and if "FX=1", the process proceeds to step S42 before proceeding to step S17. In step S42, the microcomputer 110 discriminates whether or not a steering end state has been achieved by referring to the steering end signal SGE. If a steering end state has been achieved, the process proceeds to step S17 from step S42.

On the other hand, in step S19 of FIG. 6, if the steering end signal SGE is not in a steering end state, the process proceeds to step S43 from step S19. In step S43, the microcomputer 110 discriminates the state of the flag Fx. Specifically, if "Fx=1" in step S43, the process proceeds to step S44, and if "Fx=0", the process returns to step S19.

Besides, in step S44, the microcomputer 110 discriminates whether or not the electric signal SGL or SGR has been turned off from an on state, and if it has been turned off, the process proceeds to step S20B.

Furthermore, the microcomputer 110 discriminates whether or not a prescribed condition for a "setting change" operation has been satisfied. The "setting change" operation is processing for inverting the value (1/0) of the flag Fx. If the prescribed condition for the "setting change" operation has been satisfied, the process proceeds to step S45. Specific examples of the prescribed condition for the "setting change" operation are as follows:

(A) A case where the steering angle is close to 0 (zero), and the signal SGL or SGR has been kept in an on state for a prescribed period of time (of, for example, 10 seconds) or longer and then turned off.

(B) A case where the steering angle is close to 0 (zero), and the signal SGL or SGR has been repeatedly turned on by a plurality of times in a prescribed period of time (of, for example, 5 seconds).

The microcomputer 110 makes comparison with, for example, the condition (A) or (B) above based on a time period measured with the internal timer, so as to discriminate whether or not the prescribed condition for the "setting change" operation has been satisfied. Incidentally, parameters of time period and number of times for such a condition may be held in the nonvolatile memory 120.

If the prescribed condition for the "setting change" operation has been satisfied, the microcomputer 110 inverts the value (1/0) of the flag Fx. Specifically, if the flag Fx has had a value "0", it is changed to "1", and if the flag Fx has had a value "1", it is changed to "0". Thereafter, the process returns to step S13. Thus, the setting change is terminated.

<Advantages of Turn Signal Indicator Device 100>

In the case where the turn signal indicator device 100 performing the operation of FIG. 6 is employed, an operation method for the operation lever 10 (a combination of a function and an operation) for distinguishing the turn signal indicating operation for the course change and the turn signal indicating operation for the lane change can be adjusted by a driver himself/herself as he/she likes or switched for improving the operability.

Specifically, in the operation of FIG. 6, the value (1/0) of the flag Fx can be inverted by performing an operation corresponding to the condition (A) or (B) described above.

In the case where the flag Fx has a value "0" (namely, is in an initial state), the processing of step S42 is skipped if the operating time of the operation lever 10 is short (if "Tx≤Tth1"). Therefore, the time for continuing the turn signal indication is determined in accordance with the operating time. Alternatively, if the operating time of the operation lever 10 is long (if "Tx>Tth1"), the turn signal indicating operation is continued until a steering end state is detected in step S19.

On the other hand, in the case where the flag Fx has a value "1", if the operating time of the operation lever 10 is short (if "Tx≤Tth1"), the processing of step S42 is executed. Then, the turn signal indicating operation is continued until a steering end state is detected in step S42. Alternatively, if the operating time of the operation lever 10 is long (if "Tx>Tth1"), even before a steering end state is detected in step S19, the turn signal indicating operation is terminated at a time when it is detected in step S44 that the electric signal SGL or SGR has been turned off. Therefore, the time for continuing the turn signal indicating operation is determined in accordance with the operating time.

Specifically, when a driver switches the value of Flag Fx between 0 and 1, the correlation between the length of the operating time (Tx) of the operation lever 10 and each of the function to output the turn signal indication during a time period when the operation lever 10 is operated and the function to output the turn signal indication until a steering end state is detected can be switched at a time.

Incidentally, in the case where the operation lever has, as illustrated in FIG. 8, the operation positions (PL1, PL2, PR1 and PR2) of the two stages, the turn signal indicating operation for the course change and the turn signal indicating operation for the lane change are determined depending on the physical positions, and hence, the operation positions cannot be changed. In the turn signal indicator device 100 of the present embodiment, however, the function of the turn signal indication for the course change and the function of the turn signal indication for the lane change can be allocated to the operation positions of the operation lever 10 provided merely as one stage as illustrated in FIG. 1.

Furthermore, a specific state of the correlation between the operation method (a difference in the length of the time Tx) and each of a plurality of functions cannot be always optimum because there is a sensuous difference among individuals. When the operation of FIG. 6 is performed, a user himself/herself can simply select the allocation of the plural functions and the operation methods, and hence, a user can make adjustment as he/she likes for improving the operability <Fifth Embodiment>
<Structure and Operation of Device>

Figure 7:
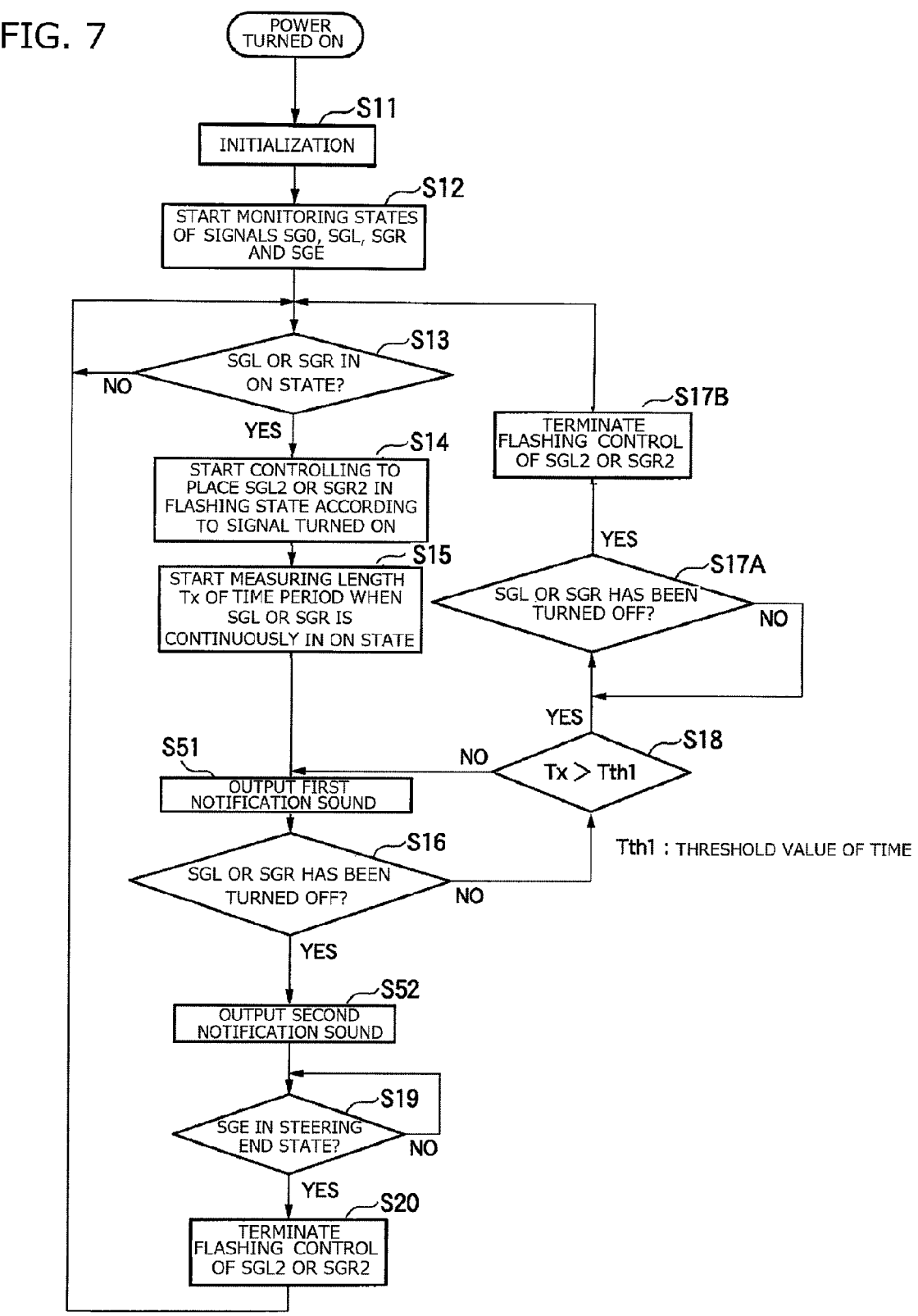
FIG. 7 is a flowchart of a modification (4) of the operation of the turn signal indicator device.

The structure of the turn signal indicator device 100 of the present embodiment is the same as that of FIG. 1. Besides, the operation of the turn signal indicator device 100 of the present embodiment is illustrated in FIG. 7. Incidentally, the operation of FIG. 7 is a modification of the operation of FIG. 2, and like step numbers are used to refer to like processing.

The operation of FIG. 7 will now be described. In FIG. 7, the operation performed in step S11 to step S20 is the same as that of FIG. 2, and processing of step S51 and step S52 are additionally performed.

In step S51, the microcomputer 110 controls the notification sound output part 23 to output a sound of a "first notification sound" from the notification sound output part 23 for a prescribed period of time. As specific examples of the "first notification sound", a "bleep" sound, a specific melody, a message of a pseudo voice (an electrically generated voice) and the like can be presumed.

In step S52, the microcomputer 110 controls the notification sound output part 23 to output a sound of a "second notification sound" from the notification sound output part 23 for a prescribed period of time. As specific examples of the "second notification sound", a "bleep" sound, a specific melody, a message of a pseudo voice and the like can be presumed, and a different type (such as a frequency, a length or an output pattern) of a sound from the "first notification sound" is allocated.

<Advantages of Turn Signal Indicator Device 100>

When the turn signal indicator device 100 executes the operation illustrated in FIG. 7, a driver can recognize the type of an operation accepted by the turn signal indicator device 100 in response to his/her own lever operation in accordance with the type of a notification sound output from the notification sound output part 23.

Specifically, when the operation lever 10 is operated for a time period equal to or larger than the threshold value Tth1 for performing the turn signal indication for the lane change, the "first notification sound" is output from the notification sound output part 23 during the period when the operation lever 10 is operated. Owing to the "first notification sound" output from the notification sound output part 23, the driver can recognize that the turn signal indicator device 100 has accepted the desired operation. On the other hand, when the operation lever 10 is retained in the operation position PL1 or PR1 for a short period of time smaller than the threshold value Tth1 for performing the course change to turn left or right, the notification sound output from the notification sound output part 23 is changed from the "first notification sound" to the "second notification sound". Owing to the "second notification sound" output from the notification sound output part 23, the driver can recognize that the turn signal indicator device 100 has accepted the desired operation. In this manner, a driver can recognize based on the "first notification sound" or the "second notification sound" that the turn signal indicator device 100 has accepted a desired operation.

Incidentally, a parameter used for determining the type of notification sound to be output in each of steps S51 and S52 of FIG. 7 may be held in the nonvolatile memory 120, so that the parameter can be changed if necessary.

Incidentally, it is assumed that each of the switch contacts SWL, SW0 and SWR of FIG. 1 is constructed by a switch mechanically opening/closing, but such a switch may be replaced with a sensor or a semiconductor switch capable of outputting an equivalent signal.

Here, the features of the embodiments of the turn signal indicator device according to the present invention described above are simply summarized as the following [1] to [6]:

[1] A turn signal indicator device that drives a turn signal indicator (turn signal lamps 21 and 22) provided on a vehicle, the turn signal indicator device including: an operation lever (10) swingable from a neutral position (P0) disposed between a first operation position (PL1) and a second operation position (PR1) to the first operation position (PL1) or the second operation position (PR1); and switches (switch contacts SWL, SWR and SW0) to be turned on/off when the operation lever (10) is swung to the first operation position (PL1) or the second operation position (PR1); an operation state discrimination part (a microcomputer 110) that discriminates, based on on/off signals supplied from the switches, between first turn signal indication performed for lane change of a vehicle and second turn signal indication performed for course change of the vehicle; and a drive part (a lamp driver 130) that switches timing for energizing the turn signal indicators in accordance with the turn signal indication discriminated by the operation state discrimination part.

[2] The turn signal indicator device according to [1], in which the operation state discrimination part discriminates between the first turn signal indication and the second turn signal indication based on magnitude comparison, with a threshold value, of a length of a time period when the operation lever (10) is retained in the first operation position (PL1) or the second operation position (PR1).

[3] The turn signal indicator device according to [1], further including pressure sensors (31 and 32) that detect a pressing force applied to the operation lever (10) when the operation lever (10) is operated to the first operation position (PL1) or the second operation position (PR1), in which the operation state discrimination part discriminates between the first turn signal indication and the second turn signal indication based on magnitude comparison, with a threshold value, of a pressure detected by the pressure sensors (31 and 32).

[4] The turn signal indicator device according to [2], in which the operation state discrimination part includes a threshold value setting unit (the microcomputer 110) that sets a value of the threshold value in accordance with an operation accepted by the operation lever (10).

[5] The turn signal indicator device according to [3], in which the operation state discrimination part includes a threshold value setting unit (the microcomputer 110) that sets a value of the threshold value in accordance with an operation accepted by the operation lever (10).

[6] The turn signal indicator device according to [2], in which the operation state discrimination part includes a function changing unit (the microcomputer 110) that switches correlation between the magnitude comparison and the first turn signal indication or the second turn signal indication in accordance with an operation accepted by the operation lever (10).

[7] The turn signal indicator device according to [3], in which the operation state discrimination part includes a function changing unit (the microcomputer 110) that switches correlation between the magnitude comparison and the first turn signal indication or the second turn signal indication in accordance with an operation accepted by the operation lever (10).

[8] The turn signal indicator device according to [1], further including a notification sound output part (23) capable of selectively outputting notification sounds different in tone, in which the operation state discrimination part selects one of the notification sounds in accordance with the first turn signal indication or the second turn signal indication discriminated by itself, and the notification sound output part (23) outputs the notification sound selected by the operation state discrimination part.

The present invention has been described in detail and with reference to specific embodiments, and it will be obvious for those skilled in the art that various changes and modifications can be made without departing from the spirit and scope of the present invention.

According to the present invention, the structure of an operation lever can be simplified, and the number of electric contacts can be reduced. Besides, an area (region) where the electric contacts are provided can be made small. The present invention having such effects is useful in the field of turn signal indicator devices for vehicles.

What is claimed is:

1. A turn signal indicator device that drives a turn signal indicator provided on a vehicle, the turn signal indicator device comprising:
   an operation lever swingable from a neutral position disposed between a first operation position and a second operation position to the first operation position or the second operation position;
   a switch to be turned on/off when the operation lever is swung to the first operation position or the second operation position;
   an operation state discrimination part that discriminates, based on an on/off signal supplied from the switch, between first turn signal indication performed for lane change of a vehicle and second turn signal indication performed for course change of the vehicle;
   a drive part that switches timing for energizing the turn signal indicator in accordance with the turn signal indication discriminated by the operation state discrimination part; and
   a pressure sensor that detects a quantitative value of magnitude of pressing force applied to the operation lever when the operation lever is operated to the first operation position or the second operation position,
   wherein the operation state discrimination part discriminates between the first turn signal indication and the second turn signal indication based on a difference in the magnitude of pressing force detected by the pressure sensor.

2. The turn signal indicator device according to claim 1, wherein the operation state discrimination part discriminates between the first turn signal indication and the second turn signal indication based on a comparison of the magnitude of pressing force detected by the pressure sensor with a threshold value.

3. The turn signal indicator device according to claim 2, wherein the operation state discrimination part includes a threshold value setting unit that sets a value of the threshold value in accordance with an operation accepted by the operation lever.

4. A turn signal indicator device that drives a turn signal indicator provided on a vehicle, the turn signal indicator device comprising:
   an operation lever swingable from a neutral position disposed between a first operation position and a second operation position to the first operation position or the second operation position;
   a switch to be turned on/off when the operation lever is swung to the first operation position or the second operation position;
   an operation state discrimination part that discriminates, based on an on/off signal supplied from the switch, between first turn signal indication performed for lane change of a vehicle and second turn signal indication performed for course change of the vehicle; and
   a drive part that switches timing for energizing the turn signal indicator in accordance with the turn signal indication discriminated by the operation state discrimination part,
   wherein the operation state discrimination part discriminates between the first turn signal indication and the second turn signal indication based on magnitude comparison, with a threshold value, of a length of a time period when the operation lever is retained in the first operation position or the second operation position, and wherein the operation state discrimination part includes a function changing unit that switches correlation between the magnitude comparison and the first turn signal indication and the second turn signal indication in accordance with an operation accepted by the operation lever.

5. The turn signal indicator device according to claim 2, wherein the operation state discrimination part includes a function changing unit that switches correlation between the magnitude comparison and the first turn signal indication and the second turn signal indication in accordance with an operation accepted by the operation lever.

6. The turn signal indicator device according to claim 1, further comprising a notification sound output part capable of selectively outputting notification sounds different in tone, wherein the operation state discrimination part selects one of the notification sounds in accordance with the first turn signal indication or the second turn signal indication discriminated by itself, and the notification sound output part outputs the notification sound selected by the operation state discrimination part.

* * * * *